United States Patent [19]

Witkowski

[11] Patent Number: 5,446,403

[45] Date of Patent: Aug. 29, 1995

[54] POWER ON RESET SIGNAL CIRCUIT WITH CLOCK INHIBIT AND DELAYED RESET

[75] Inventor: Todd R. Witkowski, Benton Harbor, Mich.

[73] Assignee: Zenith Data Systems Corporation, Buffalo Grove, Ill.

[21] Appl. No.: 192,178

[22] Filed: Feb. 4, 1994

[51] Int. Cl.6 .................................................. H03K 3/014
[52] U.S. Cl. ................................... 327/143; 327/398; 326/94
[58] Field of Search .................. 307/480, 443, 272.3, 307/592, 296.1, 296.4, 593, 603; 326/94; 327/143, 398

[56] References Cited

U.S. PATENT DOCUMENTS

| | | | |
|---|---|---|---|
| 4,558,233 | 12/1985 | Nakamori | 307/267 |
| 4,641,044 | 2/1987 | Shiraishi | 307/480 |
| 4,933,902 | 6/1990 | Yamada et al. | 307/272.3 |
| 4,940,909 | 7/1990 | Mulder et al. | 307/202.1 |
| 5,212,412 | 5/1993 | Atriss et al. | 307/264 |
| 5,323,066 | 6/1994 | Feddeler et al. | 307/272.3 |
| 5,343,085 | 8/1994 | Fujimoro et al. | 307/272.3 |

Primary Examiner—Edward P. Westin
Assistant Examiner—Benjamin D. Driscoll
Attorney, Agent, or Firm—Fitch, Even, Tabin & Flannery

[57] ABSTRACT

A control circuit inhibits the CLOCK input to the CPU during power-up to prevent newer submicron CPUs from locking up during a power-up condition. The control circuit also provides a delayed control signal representing that the power supply has stabilized. This delayed control signal is used to consistently control the RESET signal.

16 Claims, 5 Drawing Sheets

PRIOR ART

POWER ON RESET SIGNAL CIRCUIT WITH CLOCK INHIBIT AND DELAYED RESET

BACKGROUND OF THE INVENTION

1. Field of the Invention

The present invention relates to a control circuit for a computer system and, more particularly to a control circuit for inhibiting the clock input to a central processing unit (CPU) during power-up conditions until the power supply voltage has stabilized which also provides a delayed signal to the reset circuitry to enable the CPU to be consistently reset after power-up once the inhibit to the clock signal is removed.

2. Description of the Prior Art

Figure 1:
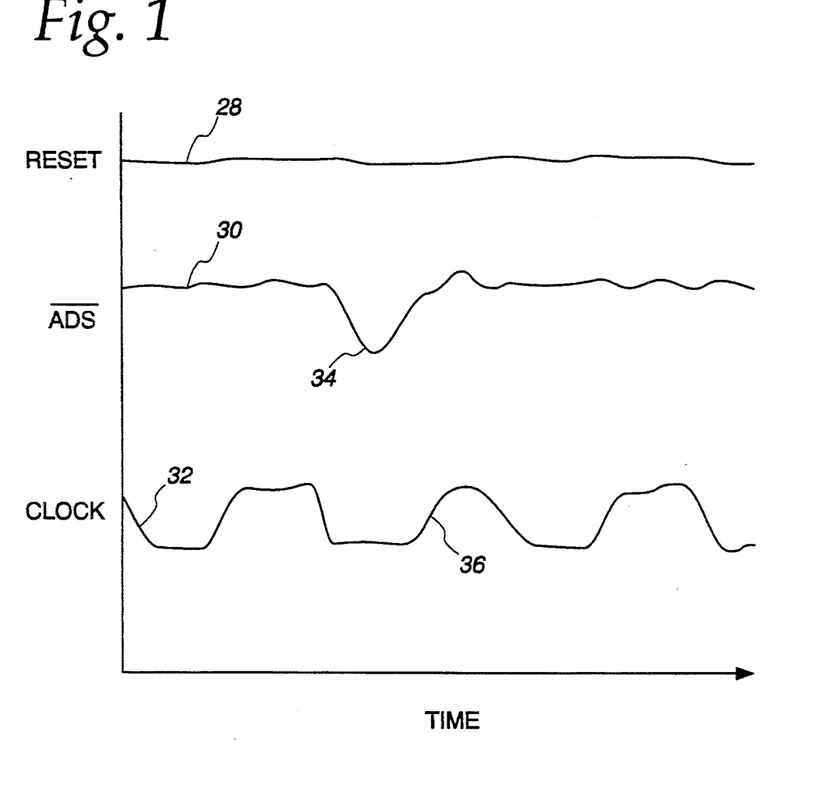
FIG. 1 is a graphical illustration representing RESET, ADS and CLK signals versus time during a condition when the CPU has become locked up during power-up.

All CPUs have a CLOCK input that controls the timing of the CPU, as well as the transfer of data relative to its data and address buses. In a typical CPU, the CLOCK input is tied to an internal phase-locked-loop (PLL) that is normally used to create a new timing reference; normally a multiple of the frequency of the CLOCK input. Heretofore, during power-up conditions, no restrictions have been known to be placed on the input CLOCK signal to the CPU. However, problems have developed with the newer submicron CPU architectures, such as the Intel 80486 DX. In particular, with such CPUs, problems have occurred when the CLOCK input has been allowed to toggle before the power supply voltage has been stabilized. Such problems include a "locking-up" condition believed to occur as a result of the CLOCK input toggling during power-up which causes as is internal PLL to get into an illegal condition causing the system to hang up. As such, when such a condition occurs, the power supply must be switched off and then back on in order to attempt to reboot the system. This problem is best illustrated with reference to FIG. I wherein, three waveforms 28, 30 and 32 are illustrated, shown in graphical form where the horizontal axis represents time or clock cycles and the vertical axis represents magnitude of the respective waveforms. The waveform 28 represents an inactive RESET signal; representing a running condition. The waveform 30 is a representation of an ADS signal, normally used by the CPU to indicate a valid address on the address bus. As shown, the ADS signal is shown in an error condition. In particular, as discussed above, during a condition when the CLOCK input is allowed to toggle during power-up, an internal PLL goes into an illegal condition, which in turn, causes the ADS signal to be generated as an error pulse 34. Since the various circuits within the computer system, such as the memory controller are synchronous and are only able to read data on rising CLOCK edges, other circuitry within the computer system and, in particular, the memory controller is unable to read the ADS error signal since the pulse 34 occurs prior to the next successive clock edge 36. As such, the memory controller indefinitely awaits an ADS signal so that it can send a handshake READY signal back to the CPU. Since the memory controller does not see the error pulse 34, the system hangs up.

Figure 2:
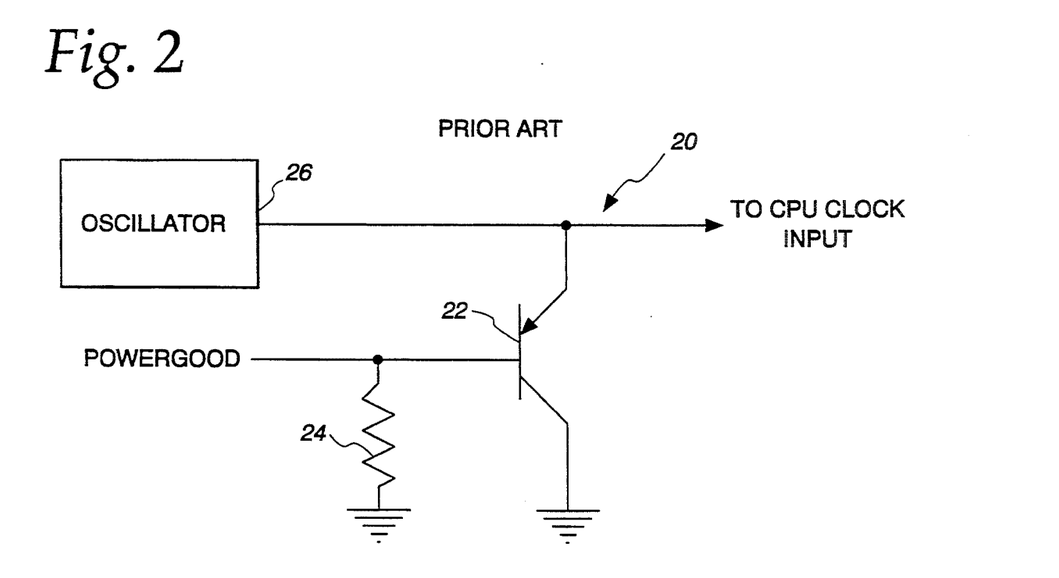
FIG. 2 is a simplified schematic drawing of a known control circuit for inhibiting the CLOCK input to a CPU during power-up conditions.
Figure 3:
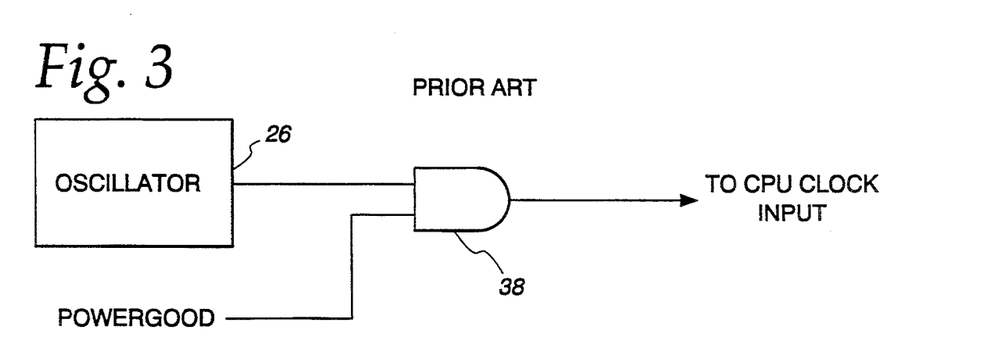
FIG. 3 is another known circuit for inhibiting the CLOCK input to a CPU during power-up condition.
Figure 4:
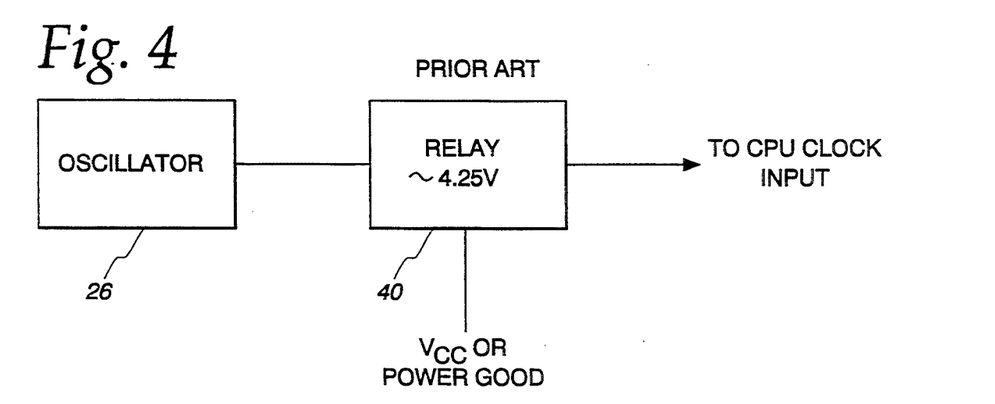
FIG. 4 is a block diagram of yet another known circuit for inhibiting the CLOCK input to a CPU during power-up conditions.

Various attempts have been made to resolve this problem. For example, FIGS. 2–4 show various methods to suppress the CLOCK input during power-up. Referring to FIG. 2. a control circuit, generally identified with the reference numeral 20, is illustrated for inhibiting the CLOCK input to the CPU. The circuit consists of a transistor 22 and a resistor 24. The circuitry 20 functions to suppress or inhibit the output of an oscillator 26 during power-up conditions. In particular, the output of the oscillator 26 is applied to the CLOCK input of the CPU. During power-up conditions, the output of the oscillator 26 is connected to ground by way of the transistor 22. The transistor 22 is under the control of a POWERGOOD signal available from the power supply. The POWERGOOD signal is normally high when the output voltage of the power supply (i.e., $V_{cc}$) has stabilized. Thus, during power-up conditions, the POWERGOOD signal is low. This low POWERGOOD signal turns the transistor 22 on to effectively ground the output of the oscillator 26 during power-up conditions. Once the output voltage of the power supply stabilizes, the POWERGOOD signal goes high which, in turn, rams off the transistor 22 to effectively remove the inhibit froill the output of the oscillator 26.

FIGS. 3 and 4 illustrate other known circuits used to inhibit the CLOCK input to the CPU during power-up conditions. Referring first to FIG. 3, the output of the oscillator 26 is ANDed with the POWERGOOD signal by way of an AND gate 38. The output of the AND gate 38, in turn, is applied to the CLOCK input of the CPU. During power-up conditions, the POWERGOOD signal is low which effectively disables the output of the oscillator 26 until the output voltage of the power supply has stabilized. The circuitry in FIG. 4 is similar except that a relay 40 is used. In that circuit, tile output or the oscillator 26 is connected in series with a set of contacts (not shown) from the relay 40. The contacts, in turn, are connected to the CLOCK input of the CPU. The relay 40 is under the control of either the power supply voltage $V_{cc}$ or the POWERGOOD signal. In particular, either the power slippery voltage $V_{cc}$ or the POWERGOOD signal is applied to the coil (not shown) of the relay 40. Since such coils normally have a minimum pickup voltage, the oscillator 26 would effectively be disconnected from the CLOCK input of the CPU during power-up conditions since either a low POWERGOOD signal or the power supply voltage $V_{cc}$ voltage being less than the picktip voltage of the relay 40 would keep the relay 40 from being energized during such a condition which, in turn, would keep the contacts from closing to enable the output of the oscillator 26 from being applied to the CLOCK input of the CPU.

Figure 5:
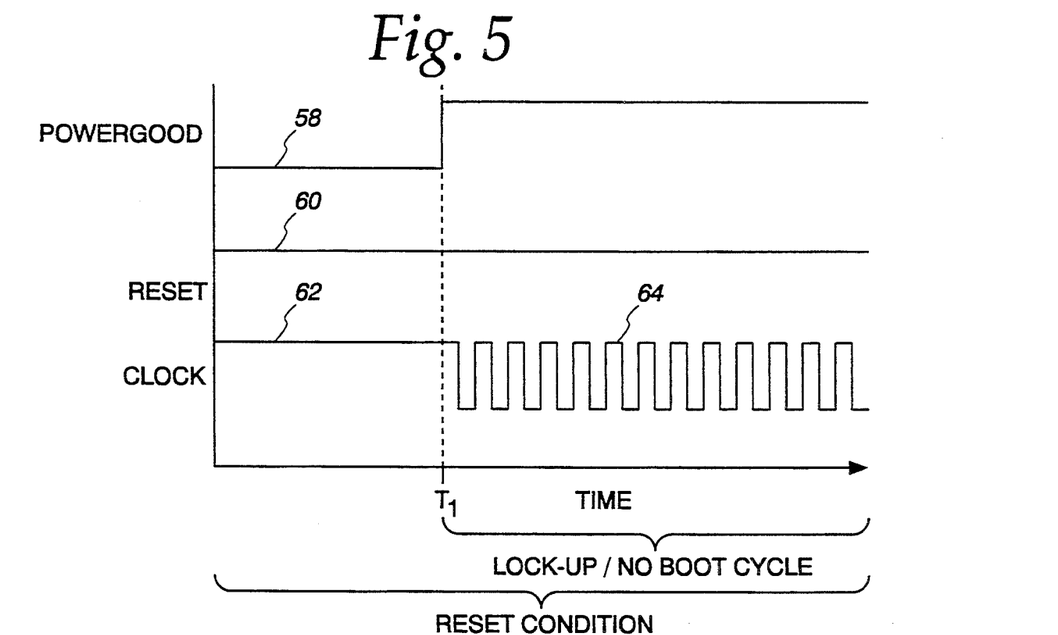
FIG. 5 is a graphical illustration of the POWERGOOD, RESET and CLOCK waveforms during a condition when the reset circuitry has not cleared after a power-up.
Figure 6:
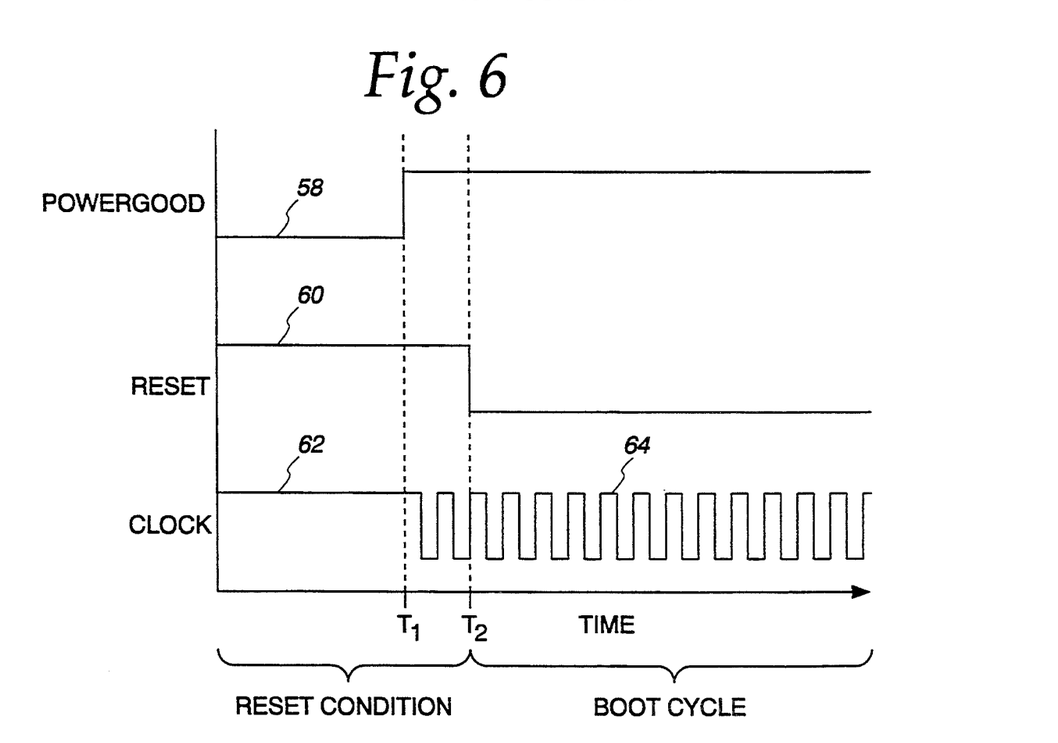
FIG. 6 is similar to FIG. 5 but illustrates a condition where the system RESET has been cleared after a power-up condition.

Although the control circuits illustrated in FIGS. 2–4 is effective to inhibit the CLOCK input to the CPU until the power supply voltage $V_{cc}$ has stabilized, there are other problems attendant with the use of such circuits. In particular, such control circuits do not address the problem regarding the system reset during power-up conditions. More particularly, during power-up conditions, the CPU is normally reset to force the CPU and, in particular, the internal registers therewithin to a known state. The RESET signal is normally generated externally to the CPU, for example, by a memory controller which may be an Intel Model No. 82424TX. Normally, a RESET signal is normally generated by the bus controller within a few clock cycles anew power-up in order to reset the CPU to a known state. However, the generation of the RESET signal after a power-up has been inconsistent when known circuits, such as those illustrated in FIGS. 2–4 are used. Examples of such inconsistent results utilizing prior art circuitry as discussed above is illustrated in FIGS. 5 and 6. In particular, FIGS. 5 and 6 illustrate known waveforms 58, 60 and 62 for the POWERGOOD, RESET and CLOCK signals, respectively, during a power-up condition utilizing prior an control circuits, such as the circuits illustrated in FIGS. 2–4 which inhibit the CLOCK input of the CPU until the power supply voltage $V_{cc}$ has stabilized. Referring first to FIG. 5, during the time period $T_1$, the power supply voltage $V_{cc}$ is stabilizing. During this time period, the POWERGOOD signal is low, which, in turn, inhibits the CLOCK waveform 62 as shown. As mentioned above, the circuitry for the RESET waveform 60 is synchronous circuitry and, therefore, requires a CLOCK input for proper operation. Therefore, during the time period $T_1$, the RESET signal is active high, maintaining the system in a RESET condition. At time period $T_1$, the power supply voltage $V_{cc}$ stabilizes and causes a transition of the POWERGOOD signal, forcing that signal to go high. As mentioned above, once the POWERGOOD signal goes high, the inhibit is removed from the CLOCK input to enable periodic clock pulses 64 to be fed into the CLOCK input of the CPU, as well as the bus controller. Ideally, within a predetermined number of CLOCK cycles after the inhibit of the CLOCK input is removed, the reset circuitry within the bus controller forces the RESET signal low to remove the system RESET and enable the CPU to boot. However, as illustrated in FIG. 5, the active high RESET waveform 60 remains high, keeping the system in RESET and forcing the user to switch the power supply off and then back on, and attempt to reboot the system.

FIG. 6 illustrates an example where the RESET signal was properly cleared after a predetermined number of CLOCK cycles once the power supply voltage $V_{cc}$ stabilized. Similar to FIG. 5, the power supply stabilizes at time $T_f$ causing the POWERGOOD signal 58 to transition from a low to a high. As mentioned above, the high POWERGOOD signal removes the inhibit from the CLOCK input of the CPU to cause periodic CLOCK pulses 64 to be applied to the CLOCK input. On this trial, the RESET signal was properly cleared within a predetermined number of CLOCK cycles after the time $T_1$. In particular, with reference to the waveform 60, the RESET signal transitions from an active high to a low condition at time $T_2$. During this trial, the RESET signal was cleared by the bus controller in order to enable the system to boot in the normal sequence.

The circuitry illustrated in FIGS. 2–4 is adapted to disable the CLOCK input to the CPU until the power supply voltage $V_{cc}$ is stabilized (i.e., POWERGOOD goes high). However, these circuits do not address the problem relating to the reset circuitry as discussed above and, further, create an additional problem. In particular, the circuits illustrated in FIGS. 3 and 4 both utilize components 38 and 40 in-line between the oscillator 26 and the CLOCK input to the CPU. These components 38 and 40 add a delay to the output CLOCK signals from the oscillator 26. Since it is known to use various CLOCK signals within a computer system, the delay of the signals to the CLOCK input to the CPU would cause the CPU timing to be out of time with respect to other related devices which are driven directly by the oscillator 26; for example, a bus controller.

SUMMARY OF THE INVENTION

It is an object of the present invention to solve various of the problems of the prior art.

It is another object of the present invention to provide a control circuit for inhibiting the CLOCK input to a CPU during power-up.

It is a further object of the present invention to force consistent operation of the RESET signal after the power supply voltage $V_{cc}$ is stabilized and the CPU CLOCK is enabled.

Briefly, the present invention relates to a control circuit which inhibits the CLOCK input to the CPU during power-up conditions to prevent newer submicron CPUs from locking up during a power-up condition. The control circuit also provides a delayed control signal representing that the power supply has stabilized. This delayed control signal is used by the reset circuitry in order to provide consistent control of the RESET signal alter the power supply voltage has stabilized and the CLOCK input to the CPU is enabled.

DESCRIPTION OF THE DRAWINGS

These and other objects of the present invention will be readily apparent from the following description and attached drawings wherein.

DETAILED DESCRIPTION OF THE PREFERRED EMBODIMENT

Figure 9:
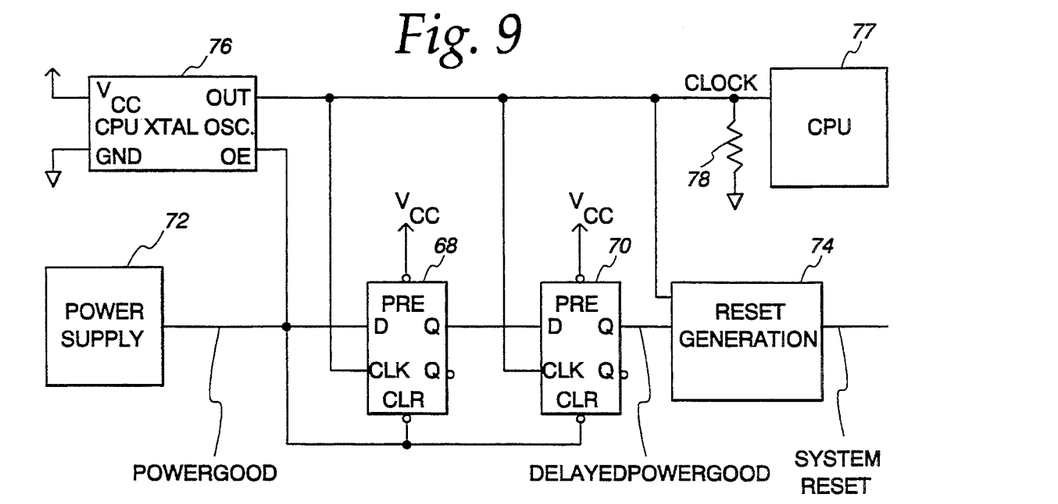
FIG. 9 is a schematic drawing of a control circuit in accordance with the present invention.
Figure 10:
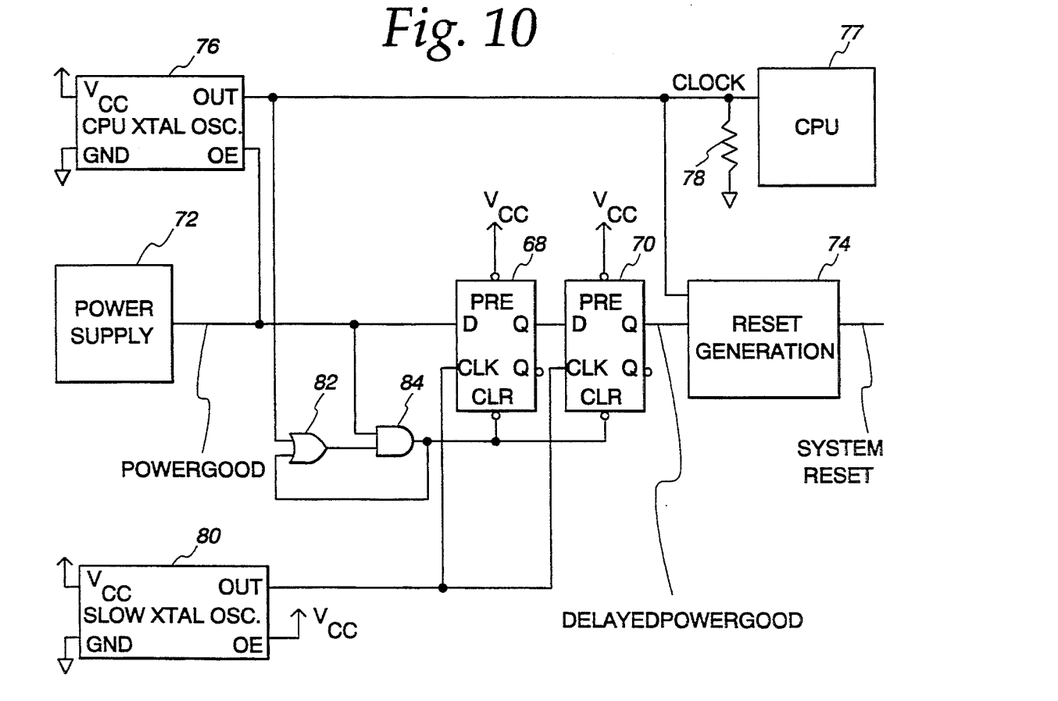
FIG. 10 is a schematic diagram of an alternate embodiment of the control circuit in accordance with the present invention.

The control circuit, in accordance with the present invention is illustrated in FIG. 9. An alternative embodiment of the present invention is illustrated in FIG. 10. Both control circuits are adapted to provide consistent control of the RESET signal during power-up conditions. In particular, both of the control circuits utilize the POWERGOOD signal from the power supply to disable the CLOCK input to the CPU during a power-up condition. By disabling the CLOCK input of the CPU during a power-up condition, the risk of placing the internal phase-lock loop (PLL) into an illegal condition and "locking up" the system is visually nonexistent for the newer submicron architecture CPUs which require the CLOCK input to be held in a constant state during power-up. Unlike the prior aft control circuits illustrated in FIGS. 3 and 4, the control circuit in accordance with the present invention does not require any components in line between the clock generator and the CLOCK input of the CPU. As such, the control circuit in accordance with the present invention will not cause timing problems with other devices, such as a bus controller, that are driven by either other clock generators or other outputs of a frequency or a clock generator having multiple outputs of different frequencies.

An important aspect of the invention is the ability of the control circuit to provide consistent results with respect to controlling the RESET signal after a power-up condition. More particularly, the prior art control circuits illustrated above result in inconsistent control of the RESET signal after a power-up condition. One of the reasons for such inconsistencies is believed to be due to the fact that the transition of the POWERGOOD signal from a low to an active high is not sensed by the RESET circuitry within the bus controller. More particularly, the state machine within the bus controller needs to monitor the transition of the POWERGOOD signal. However, since the clock is inhibited until the transition of the POWERGOOD signal, inconsistent control of the RESET signal from the bus controller has resulted. By allowing the transition of the POWERGOOD signal to occur prior to the CLOCK being enabled and, hence, the state machine being enabled, it is possible that the system may also fail to initially assert the RESET signal or alternatively fail to dessert the RESET signal which would result in improper operation of the machine.

Figure 7:
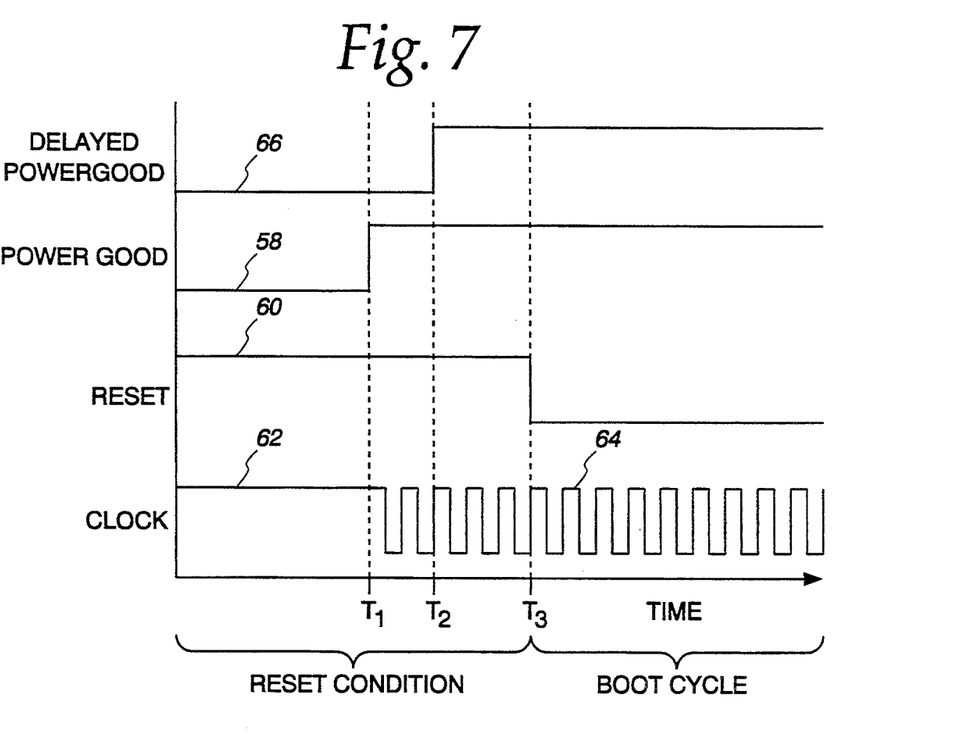
FIG. 7 is a graphical representation of a delayed POWERGOOD signal generated in accordance with the present invention shown relative to a POWERGOOD, RESET and CLOCK signal illustrating the RESET signal being cleared after power-up.
Figure 8:
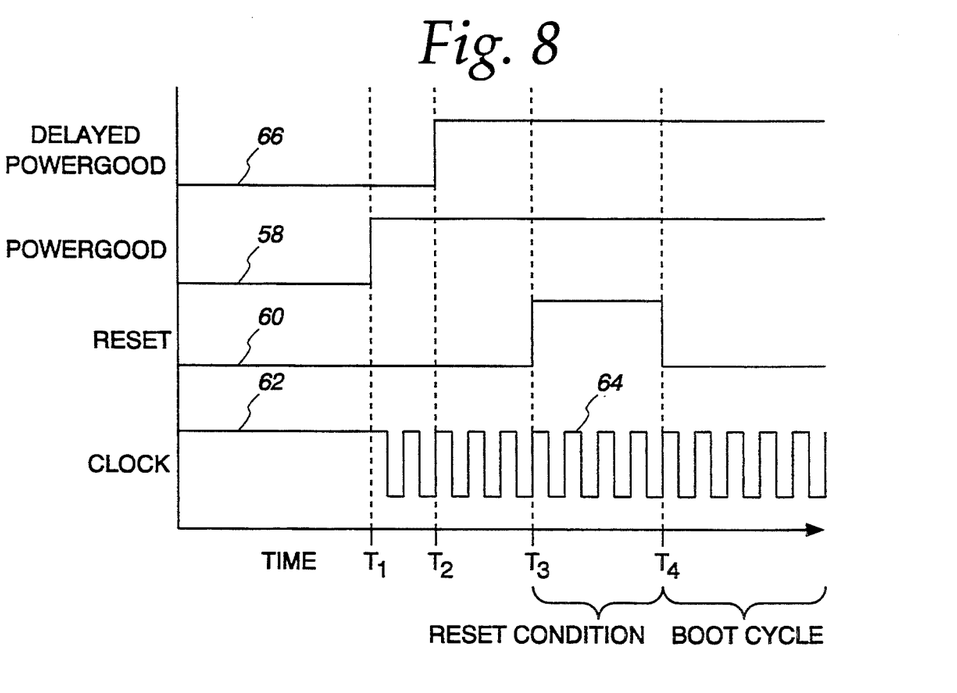
FIG. 8 is similar to FIG. 7 but illustrating a condition wherein the RESET signal is set alter power-up.

The reset control circuits illustrated in FIGS. 9 and 10 solve this problem by providing a delayed POWERGOOD signal to the reset circuitry within the bus controller 74. The delayed POWERGOOD signal enables an internal state machine within the bus controller 74 to sense the transition of the POWERGOOD signal. As such, the bus controller 74 is able to consistently control the RESET, as illustrated in FIGS. 7 and 8. More particularly, FIG. 7 refers to a condition where at a time 0 the RESET signal 60 is active. At time $T_1$, the POWERGOOD signal 58 transitions from a low to an active high state, indicating that the power supply voltage $V_{cc}$ has stabilized. As mentioned above, the transition of the POWERGOOD signal enables the CLOCK input. In this situation, the control circuitry in accordance with the present invention is utilized to develop a delayed POWERGOOD signal that is applied to the internal state machine of the bus controller 74, which, in turn, enables the internal state machine to sense the transition of the POWERGOOD signal. In particular, the waveform 66 is representative of the delayed POWERGOOD signal. As shown in FIG. 7, the delayed POWERGOOD signal transitions at time $T_2$. This transition occurs alter a predetermined number of CLOCK pulses 64 to enable the internal state machine within the bus controller 74 to sense the transition. Once the transition is sensed by the internal state machine within the bus controller 74, the RESET signal 60 is forced low to remove the system RESET and allow the CPU to boot in the normal sequence.

FIG. 8 illustrates a condition in which the RESET signal is low at time $T_0$. In this condition, for proper operation of the CPU, it is necessary for the state machine to force the RESET signal high in order to place all the internal registers within the CPU in a known condition. During this condition, the POWERGOOD signal transitions at time $T_1$, enabling the CLOCK input of the CPU. By applying the delayed POWERGOOD signal to the internal state machine within the bus controller 74, the transition of the delayed POWERGOOD signal at $T_2$ will be sensed by the state machine several cycles alter the CLOCK input is enabled. Once the transition of the delayed POWERGOOD signal is sensed, the state machine will then be able to force the RESET signal high to force a system RESET in order to force the internal registers within the CPU to a known state to ensure proper operation of the CPU. As shown, after the internal registers within the CPU are RESET, the internal state machine will subsequently drive the RESET signal low at time $T_4$ to remove the system RESET and allow the CPU to reboot in he normal sequence.

The reset control circuits, in accordance with the present invention, are illustrated in FIGS. 9 and 10. Referring first to FIG. 9, the RESET control circuit in accordance with the present invention includes a pair of toggle flip flops 68 and 70. In this application, the POWERGOOD signal is applied directly to the D input of the first flip flop 68. As mentioned above, the POWERGOOD signal is an available signal from a known power supply 72, such as LITEON, Model No. PA-111-4. The "Q" output of the flip flop 68 is tied to the D input of the flip flop 70, while the "Q" output of the flip flop 70 is the DELAYED POWERGOOD signal, which, in turn, is applied to a state machine 74 for generating the system RESET signal. In the embodiment illustrated in FIG. 9, an output signal frown an external CPU clock generator 76 is applied directly to the CLOCK input of the CPU. The CLOCK input of the CPU is also tied to ground by way of a pull down resistor 78. The pull down resistor 78 provides pulse shaping of the CLOCK signals and also pulls down the output to the CLOCK generator 76 when the CLOCK generator 76 is inhibited. The output of the CLOCK generator 76 is used to drive the flip flops 68 and 70 and is, thus, applied to the CLK inputs of the flip flops 68 and 70.

In order to inhibit the CLOCK input to the CPU while the power supply voltage $V_{cc}$ is stabilizing, the POWERGOOD output of the power supply 72 is applied to the output enable (OE) input of the external CLOCK generator 76. By applying the POWERGOOD signal to the output enable (OE) input of the CLOCK generator, the CLOCK generator 76 will be inhibited during power-up conditions which, in turn, will prevent toggling of the CLOCK input to the CPU during such conditions. Once the power supply voltage stabilizes, the POWERGOOD signal will go active high to enable the external CLOCK generator 76 by applying a high to the output enable (OE) which will enable the external CLOCK generator 76 to generate the pulses 64. These CLOCK pulses 64, in addition to driving the flip flops 68 and 70, as well as the CLOCK input of the CPU, are also applied to the state machine within the bus controller 74.

At power-up, the POWERGOOD signal is low. In order to clear the "Q" outputs of the flip flops 68 and 70 at power-up, the POWERGOOD signal is applied to the clear CLR inputs of the flip flops 68 and 70. Since the POWERGOOD signal is initially low at power-up, the "Q" outputs of each of the flip flops 68 and 70 will be cleared. Once the POWERGOOD signal transitions to a high, a high signal will be applied to the D input of the flip flop 68. Since the flip flops 68 and 70 are only active on CLOCK cycles, the initial high signal to the D input of the 68 will result in the "Q" output of the flip flop 68 being low as well as the "Q" output of the flip flop 70 being low. On the first CLOCK pulse, the "Q" output of the flip flop 68 will go high; however, at such time, the "Q" output of the flip flop 70 and, hence, the delayed POWERGOOD signal will be low. On the second CLOCK pulse, the "Q" output of the flip flop 68 will be high as well as the "Q" output of the flip flop 70 and, in turn, the delayed POWERGOOD signal. Thus, the control circuit, illustrated in FIG. 9, delays the transition of the POWERGOOD signal for two CLOCK cycles in order to enable the transition of the POWERGOOD signal to be sensed by the state machine within the bus controller 74. By enabling the state machine to sense the transition of the POWERGOOD signal the present invention is able to consistently control the RESET signal. In addition, the circuitry further inhibits toggling of the CLOCK input to the CPU during power-up conditions to prevent the PLL from getting into an illegal condition and "locking up" the system.

An alternate embodiment of the invention is illustrated in FIG. 10. In this embodiment, the POWERGOOD signal can be delayed by even a longer period of time by using a slower CLOCK generator 80 to drive the flip flops 68 and 70. In particular, the CPU CLOCK generator 76 is applied to the CLOCK input of the CPU. However, the CLOCK (CLK) inputs of the flip flops 68 and 70 are driven by the relatively slower CLOCK generator 80. The CLOCK generator 80 may be another CLOCK generator readily available within a personal computer, such as an oscillator input to the real time clock which generates clock pulses at a frequency of 32.768 kilohertz.

In this application, the POWERGOOD signal from the power supply 72 is applied to the operate enable (OE) input of the CPU CLOCK generator 76 to inhibit or disable the CLOCK generator 76 until the power supply voltage $V_{cc}$ has stabilized. Similar to the circuitry illustrated in FIG. 9, the POWERGOOD signal is also toggled through the flip flops 68 and 70 to generate the delayed POWERGOOD signal which is used by the state machine 74 to generate the system RESET signal. However, in this embodiment, the relatively slower external CLOCK generator 80 is used to toggle the POWERGOOD signal through the flip flops 68 and 70. In this application, assuming that the relatively slower external CLOCK generator 80 is the oscillator input to the real time clock which generates a clock frequency at 32.768 kilohertz and the external CPU CLOCK 76 is in the 25 to 33 megahertz range, the delayed POWERGOOD signal will be delayed approximately 1500 cycles of the CPU CLOCK 76.

In order to maintain the output of the flip flops 68 and 70 low during power-up condition. A circuit which includes an OR gate 82 and an AND gate 84 is utilized. In particular. A CPU CLOCK signal is ORed with an ENABLE signal available at the output of the AND gate. The output of the OR gate 82 is ANDed with the POWERGOOD signal by way of the AND gate 84 to generate the ENABLE signal. Initially, at power-up the output frown the CPU CLOCK generator 76 will be low as will be the POWERGOOD signal, thereby disabling the AND gate 84 to generate an active low enable signal that is applied to the CLR inputs of the flip flops 68 and 70. By forcing the CLR inputs low during power-up, the "Q" outputs of the flip flops 68 and 70 will be held low during power-up. Once the power supply voltage $V_{cc}$ stabilizes, the POWERGOOD signal will go active high which, in turn, will enable the output of the CPU CLOCK generator 76 to force the output of the OR gate 82 to go high. Since the POWERGOOD signal is also high, the output of the AND gate 84 will be high, forcing the ENABLE signal high, which disables the CLR input of the flip flops 68 and 70 after the POWERGOOD signal goes high to enable the POWERGOOD signals to be clocked through the flip flops 68 and 70 under the control of the external CLOCK generator 80. In order to force the CLR inputs to be disabled while the POWERGOOD signal is active high, the output of the AND gate 84 is fed back into an input of the OR gate 82. Thus, during power-up, the CLR inputs of the flip flops 68 and 70, which are active low, are held low in order to force the "Q" outputs of the flip flops 70 low. Once the power supply voltage $V_{cc}$ is stabilized, the ENABLE signal goes high to enable the POWERGOOD signal to be clocked through the flip flops 68 and 70.

Obviously, many modifications and variations of the present invention are possible in light of the above teachings. Thus, it is to be understood that within the scope of the appended claims, the invention may be practiced otherwise than as specifically designated above.

What is desired to be claimed by a Letters Patent is:

1. A control circuit for controlling a RESET signal in a computer system which includes a power supply, a first clock for generating periodic pulses at a first predetermined frequency, a central processing unit (CPU) driven by said first clock, the control circuit comprising:

first generating means for generating a signal representing that the power supply voltage has stabilized after power-up;

second generating means for generating a RESET signal for resetting said CPU after a power-up condition:

means responsive to said first generating means for inhibiting toggling of said clock pulses to said CPU from said first clock until the power supply voltage has stabilized: and third generating means responsive to said first generating means for generating a signal representing that the power supply voltage has stabilized after a power-up, delayed in time by a predetermined time period relative to said signal generated by said first generating means, said delayed signal applied to said second generating means to enable said second generating means to sense said delayed signal once the clock pulses become uninhibited to said CPU following a power-up condition.

2. A control circuit as recited in claim 1, wherein said predetermined time second is one or more cycles of said first clock.

3. A control circuit for controlling a RESET signal in a computer system which includes a power supply, a first clock for generating periodic pulses at a first predetermined frequency, a central processing unit (CPU) driven by said first clock, the control circuit comprising:

a first generating means for generating a signal representing that the power supply voltage has stabilized after power-up;

second generating means for generating a RESET signal for resetting said CPU after a power-up condition;

means responsive to said first generating means for inhibiting toggling of said clock pulses to said CPU from said first clock until the power supply voltage has stabilized;

third generating means responsive to said first generating means for generating a signal representing that the power supply voltage has stabilized after a power-up, delayed in time by a predetermined time period relative to said signal generated by said first generating means, said delayed signal applied to said second generating means to enable said second generating means to sense said delayed signal once the clock pulses become uninhibited to said CPU following a power-up condition; and means for generating second clock pulses of a second predetermined frequency, said predetermined time period being established by said second clock pulses.

4. A control circuit as recited in claim 3, wherein the frequency of said second clock pulses is relatively slower than the frequency of said first clock.

5. A control circuit as recited in claim 1, wherein said third generating means includes a predetermined number of toggle flip flops, each having a D input and a clock CLK input said signal from said first generating means being connected to the D input of one of said predetermined number of toggle flip flops and said clock CLK input being driven by clock pulses having a predetermined frequency.

6. A control circuit as recited in claim 5, wherein said predetermined frequency is said first predetermined frequency.

7. A control circuit for controlling a RESET signal in a computer system which includes a power supply, a first clock for generating periodic pulses at a first predetermined frequency, a central processing unit (CPU) driven by said first clock, the control circuit comprising:

first generating means for generating a signal representing that the power supply voltage has stabilized after power-up;

second generating means for generating a RESET signal for resetting said CPU after a power-up condition;

means responsive to said first generating means for inhibiting toggling of said clock pulses to said CPU from said first clock until the power supply voltage has stabilized; and third generating means responsive to said first generating means for generating a signal representing that the power supply voltage has stabilized after a power-up, delayed in time by a predetermined time period relative to said signal generated by said first generating means, said delayed signal applied to said second generating means to enable said second generating means to sense said delayed signal once the clock pulses become uninhibited to said CPU following a power-up condition, wherein said third generating means includes a predetermined number of toggle flip flops, each having a D input and a clock CLK input, said signal from said first generating means being connected to the D input of one of said predetermined number of toggle flip flows and said clock CLK input being driven by clock pulses having a predetermined frequency, wherein said predetermined frequency is different than said first predetermined frequency.

8. A control circuit for controlling a RESET signal in a computer system which includes a power supply, a first clock for generating periodic pulses at a first predetermined frequency, a central processing unit (CPU) driven by said first clock, the control circuit comprising:

first generating means for generating a signal representing that the power supply voltage has stabilized after power-up;

second generating means for generating a RESET signal for resetting said CPU after a power-up condition;

means responsive to said first generating means for inhibiting toggling of said clock pulses to said CPU from said first clock until the power supply voltage has stabilized; and third generating means responsive to said first generating means for generating a signal representing that the power supply voltage has stabilized after a power-up, delayed in time by a predetermined time period relative to said signal generated by said first generating means, said delayed signal applied to said second generating means to enable said second generating means to sense said delayed signal once the clock pulses become uninhibited to said CPU following a power-up condition, wherein said third generating means includes a predetermined number of toggle flip flops, each having a D input and a clock CLK input, said signal from said first generating means being connected to the D input of one of said predetermined number of toggle flip flops and said clock CLK input being driven by clock pulses having a predetermined frequency, wherein said predetermined frequency is relatively slower than said first predetermined frequency.

9. A control circuit for controlling a RESET signal in a computer system which includes a power supply, a first clock for generating periodic pulses at a first predetermined frequency, a central processing unit (CPU) driven by said first clock, the control circuit comprising:

first generating means for generating a signal representing that the power supply voltage has stabilized after power-up;

second generating means for generating a RESET signal for resetting said CPU after a power-up condition;

means for inhibiting clock pulses to said second generating means until said power supply voltage has stabilized;

means for enabling said second generating means to sense the transition of said signal representing that the power supply voltage has stabilized in order to force said RESET signal to be generated after said second generating means senses the transition of said signal representing that the power supply voltage has stabilized.

10. A control circuit as recited in claim 9, wherein said enabling means includes means for generating a delayed signal representing that said power supply voltage has stabilized, said delayed signal being delayed for a predetermined time period after said signal representing that the power supply voltage is stabilized, said delayed signal being applied to said second generating means.

11. A control circuit as recited in claim 10, wherein said predetermined time period is a predetermined multiple of clock pulses from said first clock.

12. A control circuit for controlling a RESET signal in a computer system which includes a power supply, a first clock for generating periodic pulses at a first predetermined frequency, a central processing unit (CPU) driven by said first clock, the control circuit comprising:
- first generating means for generating a signal representing that the power supply voltage has stabilized after power-up;
- second generating means for generating a RESET signal for resetting said CPU after a power-up condition;
- means for inhibiting clock pulses to said second generating means until said power supply voltage has stabilized;
- means for enabling said second generating means to sense the transition of said signal representing that the power supply voltage has stabilized in order to force said RESET signal to be generated after said second generating means senses the transition of said signal representing that the power supply voltage has stabilized; wherein said enabling means includes means for generating a delayed signal representing that said power supply voltage has stabilized, said delayed signal being delayed for a predetermined time period after said signal representing that the power supply voltage is stabilized, said delayed signal being applied to said second generating means; and
- a source of second clock pulses of a predetermined frequency and wherein said predetermined time period is a predetermined multiple of said second clock pulses.

13. A control circuit as recited in claim 12, wherein said second predetermined frequency is relatively slower than said first predetermined frequency.

14. A method for generating a RESET signal for resetting a central processing unit (CPU) after a power-up in a computer system which includes a first clock for generating first periodic pulses at a first predetermined frequency, a CPU and a power supply for providing power, the method comprising the steps of:
- (a) monitoring the power supply voltage and generating a first signal representing that said power supply voltage has stabilized;
- (b) inhibiting the toggling of first clock pulses to said CPU until said power supply voltage has stabilized;
- (c) generating a RESET signal for resetting said CPU after said first clock pulses become uninhibited;
- (d) controlling the generation of said RESET signal by generating a second signal representing that said power supply voltage has stabilized, said second signal being delayed a first predetermined time period relative to said first signal and forcing said second signal to precede a RESET signal after said clock pulses became uninhibited.

15. A method as recited in claim 14, wherein said predetermined time period is a predetermined multiple of said first clock pulses.

16. A method for generating a RESET signal for resetting a central processing unit (CPU) after a power-up in a computer system which includes a first clock for generating first periodic pulses at a first predetermined frequency, a CPU and a power supply for providing power, the method comprising the steps of:
- (a) monitoring the power supply voltage and generating a first signal representing that said power supply voltage has stabilized;
- (b) inhibiting the toggling of first clock pulses to said CPU until said power supply voltage has stabilized;
- (c) generating a RESET signal for resetting said CPU after said first clock pulses become uninhibited;
- (d) controlling the generating of said RESET signal by generating a second signal representing that said power supply voltage has stabilized, said second signal being delayed a first predetermined time period relative to said first signal and forcing said second signal to precede a RESET signal after said clock pulses became uninhibited, wherein said predetermined time period is not a predetermined multiple of said first clock pulses.

* * * * *

UNITED STATES PATENT AND TRADEMARK OFFICE
CERTIFICATE OF CORRECTION

PATENT NO.  : 5,446,403
DATED       : August 29, 1995
INVENTOR(S) : Todd R. Witkowski It is certified that error appears in the above-indentified patent and that said Letters Patent is hereby corrected as shown below:

Column 8, claim 3, line 66:   delete the first occurrence of "a";

Column 9, claim 5, line 28:   after "input" insert a --,--; and

Column 9, claim 7, line 66:   delete "flows" and insert --flops-- therefor.

Signed and Sealed this

Seventh Day of May, 1996

Attest:

BRUCE LEHMAN

*Attesting Officer*    *Commissioner of Patents and Trademarks*